US00RE42201E

(19) United States
(12) Reissued Patent
Matsumoto et al.

(10) Patent Number: US RE42,201 E
(45) Date of Reissued Patent: Mar. 8, 2011

(54) FACSIMILE MACHINE FOR USE IN COMBINATION WITH PC

(75) Inventors: Noriko Matsumoto, Aichi-ken (JP); Kiyotsugu Takiguchi, Nagoya (JP); Tetsuya Ouchi, Tajimi (JP)

(73) Assignee: Brother Kogyo Kabushiki Kaisha, Nagoya-shi, Aichi-ken (JP)

(21) Appl. No.: 11/806,682

(22) Filed: Jun. 1, 2007

Related U.S. Patent Documents

Reissue of:

(64) Patent No.: 6,903,845
Issued: Jun. 7, 2005
Appl. No.: 09/878,273
Filed: Jun. 12, 2001

U.S. Applications:

(62) Division of application No. 08/749,964, filed on Nov. 18, 1996, now Pat. No. 6,373,598.

(30) Foreign Application Priority Data

Nov. 16, 1995 (JP) ..... 1995-298536
Nov. 16, 1995 (JP) ..... 1995-298539

(51) Int. Cl.
*H04N 1/00* (2006.01)
*H04M 11/00* (2006.01)

(52) U.S. Cl. ..... 358/400; 379/100.05

(58) Field of Classification Search ..... 358/442, 358/400, 401, 403, 404, 405, 406, 434, 435, 358/436, 437, 439, 407, 468; 379/100.01, 379/100.05, 100.12
See application file for complete search history.

(56) References Cited

U.S. PATENT DOCUMENTS 5,048,078 A * 9/1991 Satomi et al. ..... 379/102.02

(Continued)

FOREIGN PATENT DOCUMENTS

| | | | |
|---|---|---|---|
| JP | 60029836 | * | 2/1985 |
| JP | 60029836 | * | 3/1985 |
| JP | 63-6967 | * | 1/1988 |
| JP | B-2-63-13391 | * | 3/1988 |
| JP | 63-231368 | * | 9/1988 |
| JP | 1-117562 | * | 5/1989 |

(Continued)

*Primary Examiner*—Jerome Grant, II
(74) *Attorney, Agent, or Firm*—Baker Botts L.L.P.

(57) ABSTRACT

In view of the fact that a limited storage area of a facsimile memory cannot store a large amount of data necessary to operate and manage the facsimile machine, a hard disk of a personal computer connected to the facsimile machine is used for storing such a large amount of data. For example, an application software needed for achieving a certain function of the facsimile machine is supplied from a service station managed by a manufacturer of the facsimile machine and is downloaded and installed in a hard disk of the personal computer. An example of the function is a scheduled/delayed transmission for scheduling a time of facsimile transmission at a specific time or after a certain period of time has passed. As far as the facsimile machine and the personal computer are connected, other kinds of data, such as help list data and facsimile transaction information, are stored in the hard disk of the personal computer.

24 Claims, 8 Drawing Sheets

U.S. PATENT DOCUMENTS

| | | | | | |
|---|---|---|---|---|---|
| 5,072,309 | A | * | 12/1991 | Brown | 358/434 |
| 5,216,517 | A | * | 6/1993 | Kinoshita et al. | 358/400 |
| 5,363,204 | A | * | 11/1994 | Millman | 358/406 |
| 5,388,211 | A | * | 2/1995 | Hornbuckle | 717/178 |
| 5,408,618 | A | * | 4/1995 | Aho et al. | 710/104 |
| 5,459,584 | A | * | 10/1995 | Gordon et al. | 358/434 |
| 5,621,894 | A | * | 4/1997 | Menezes et al. | 709/227 |
| 5,802,429 | A | * | 9/1998 | Yamashita | 399/8 |
| 5,950,148 | A | * | 9/1999 | Nakagawa et al. | 702/182 |
| 5,970,225 | A | * | 10/1999 | Jackson et al. | 358/1.18 |
| 6,055,361 | A | * | 4/2000 | Fujita et al. | 358/1.15 |
| 6,144,463 | A | * | 11/2000 | Utsumi et al. | 358/442 |
| 6,307,639 | B1 | * | 10/2001 | Eom et al. | 358/1.13 |
| 6,452,607 | B1 | * | 9/2002 | Livingston | 715/705 |

FOREIGN PATENT DOCUMENTS

| | | | |
|---|---|---|---|
| JP | 2-284569 | | 11/1990 |
| JP | 3-166854 | | 7/1991 |
| JP | 3-231882 | | 10/1991 |
| JP | 5-12346 | * | 1/1993 |
| JP | 5-298432 | | 11/1993 |
| JP | 5-316260 | | 11/1993 |
| JP | A-6-98077 | | 4/1994 |
| JP | 6-121100 | | 4/1994 |
| JP | 6-48270 | | 6/1994 |
| JP | 6-164882 | | 6/1994 |
| JP | 6-181514 | | 6/1994 |
| JP | 6-314202 | | 11/1994 |
| JP | 7 29956 | | 6/1995 |
| JP | 9-80987 | | 3/1997 |
| JP | 9065038 | * | 3/1997 |
| JP | 9-93383 | | 4/1997 |
| JP | 409097235 | * | 4/1997 |
| JP | 9128174 | * | 5/1997 |
| JP | 9-130509 | | 5/1997 |
| JP | 2000341462 | * | 12/2000 |

* cited by examiner

FACSIMILE MACHINE FOR USE IN COMBINATION WITH PC

Matter enclosed in heavy brackets [ ] appears in the original patent but forms no part of this reissue specification; matter printed in italics indicates the additions made by reissue.

This is a Division of application Ser. No. 08/749,964 filed Nov. 18, 1996 now U.S. Pat. No. 6,373,598. The entire disclosure of the prior application(s) is hereby incorporated by reference herein in its entirety.

BACKGROUND OF THE INVENTION

1. Field of the Invention

The present invention relates to a facsimile system having a facsimile machine connected to an external data processing device, such as a personal computer.

2. Description of the Related Art

Japanese Patent Publication (Kokoku) No. SHO-63-13391 and Japanese Laid-Open Patent Publication (Kokai) No. HEI-6-98077 describe providing an interface (I/O port) to the facsimile machine allowing to connect the facsimile machine to a personal computer (PC). Such a facsimile/PC combination is convenient because the facsimile machine can be used as a terminal of the PC. The document data produced by the PC can be sent to a remote facsimile machine through the facsimile machine serving as the terminal. Also the data sent from the remote facsimile machine can be received and stored in the memory of the PC via the facsimile machine serving as the terminal.

Facsimile machines have various functions, such as an image capturing function, a printing function, a communication function, a multi-copying function, an auto-answer function, a memory transmission function, a scheduled/delayed transmission function and so on. With the image capturing function, a document to be transmitted can be read by means of a scanner. The printing function refers to a printing capability in which image data received from a remote facsimile machine can be printed on a recording paper. The communication function is essential for the facsimile machine. By this function, image data can be transmitted to a remote facsimile machine and incoming image data can be received. The multi-copying function is capable of generating plural sets of copies of the original documents upon reading the original documents with the scanner. When the facsimile machine is set to the auto-answer mode, an incoming voice message (voice data) and/or image data from the remote facsimile machine or other data communicating device is stored in the memory of the called facsimile machine in the form of a digital signal. The image data is later printed on a recording paper and the voice message is also later reproduced from a speaker. The memory transmission is performed by storing image data in a memory prior to transmission and then transmitting the image data stored therein to the remote facsimile machine. The scheduled/delayed transmission is for scheduling a time of facsimile transmissions. If an operator scans a document into a memory-equipped machine and programs it to dial up and transmit the document at a specific time or after a certain period of time has passed, the operator can enjoy the ultimate in unattended facsimile operation.

Control programs for the various functions of the facsimile machine and for data transfer between the facsimile machine and its associated personal computer are stored in a read-only memory (ROM) equipped in the facsimile machine. Accordingly, increase of the facsimile functions requires that a ROM with an increased amount of a storage capacity be equipped in the facsimile machine. This leads to an increase of cost for manufacturing the facsimile machine. Once the facsimile machine is delivered to customers, altering the control programs contained in the ROM or offering a version-up services to the customers are difficult for many reasons.

The recent facsimile machines are provided with a help function for generating information so that a user can learn how to use the various functions. Like the control programs, an amount of help data for implementing the help function increases as the number of facsimile functions increases. The increased amount of help data requires a memory of a large storage capacity. This also increases the cost of the facsimile machine. There is a further problem in such facsimile machine that a liquid crystal display equipped in the facsimile machine is too small to display a lengthy message. Therefore, fully descriptive information to each help item cannot be provided. One possible solution to this problem would be printing out the descriptive information on recording papers using the print function of the facsimile machine. However, the help data stored in the memory of the facsimile machine is rather simplified in its contents because the limited storage capacity of the facsimile memory does not allow to store a large amount of help data. Therefore, the information is not so detailed as to satisfy the user even if it is printed out.

SUMMARY OF THE INVENTION

The present invention has been made to eliminate the above-described inconveniences. Accordingly, it is an object of the present invention to provide a facsimile system which releases the burden on a facsimile memory and effectively uses a storage area of a hard disk of a personal computer connected to the facsimile machine.

To achieve the above and other objects, there is provided a facsimile system which includes a facsimile machine, a data processing device, and a support control means. In use, the facsimile machine and the data processing device, which may be a personal computer, are connected to each other. The facsimile machine has a first storage device and the data processing device has a second storage device which may be a hard disk. The facsimile machine is provided with a variety of functions, each of which is available when a corresponding application software is provided. Examples of functions of the facsimile machine include an image capturing function, a printing function, a communication function, a multi-copying function, an auto-answer function, a memory transmission function, a scheduled/delayed function. In the present invention, a service station is provided which supplies a variety of application softwares relating to the variety of functions. The support control means is provided for controlling the second data storage device to store at least one application software supplied from the service station when a communication link is established between the facsimile machine and the service station. The facsimile machine achieves a function in accordance with the application software supplied from the service station and stored in the second storage device.

The support control means may be provided either in the facsimile machine or in the service station. In the former case, the application software is downloaded and installed in the second storage device in accordance with a request of the facsimile machine. In the latter case, the support control means is provided in the service station, wherein the service station makes a call to the facsimile machine at every predetermined interval to establish the communication link between the facsimile machine and the service station whereupon the support control means downloads and installs the application software in the second storage device in accordance with a request of the service station.

It is preferable that the first storage device store an identification code of the facsimile machine. The facsimile machine sends the identification code to the service station when the facsimile machine requests the service station to supply the application software. The service station stores identification codes of registered facsimile machines and verifies the identification code received from the facsimile machine with those stored in the service station to determine that the identification code received from the facsimile machine is valid. The service station sends the application software when the identification code is valid.

It is also preferable that the facsimile machine supply a version information of an application software which has been stored in the second storage device to the service station. Then, the service station determines a relevant application software to be sent to the facsimile machine based on the version information supplied from the facsimile machine. A display unit may be provided to display an updated version information.

In accordance with another aspect of the present invention, the second storage device of the data processing device stores help list data regarding the variety of functions. When a help key is depressed, a help list is generated based on the help list data stored in the second data storage device. The help list is generated by one of the printing section and display unit of the facsimile machine or by one of the printing section and display unit of the data processing device. Basic help list data is stored in the first storage device and is generated by the display unit of the facsimile machine to indicate the basic help list when the facsimile machine and the personal computer are disconnected from each other.

In accordance with still another aspect of the present invention, a control means is provided for controlling the second storage device to store a facsimile transaction information when the control means detects that the facsimile machine and the data processing device are connected to each other. When the control means detects that the facsimile machine and the data processing device are disconnected from each other, the control means further controls the first storage device to store the facsimile transaction information.

BRIEF DESCRIPTION OF THE DRAWINGS

The above and other objects, features and advantages of the present invention will become more apparent from the following description when taken in conjunction with the accompanying drawings, in which.

DETAILED DESCRIPTION OF THE PREFERRED EMBODIMENTS

Figure 1:
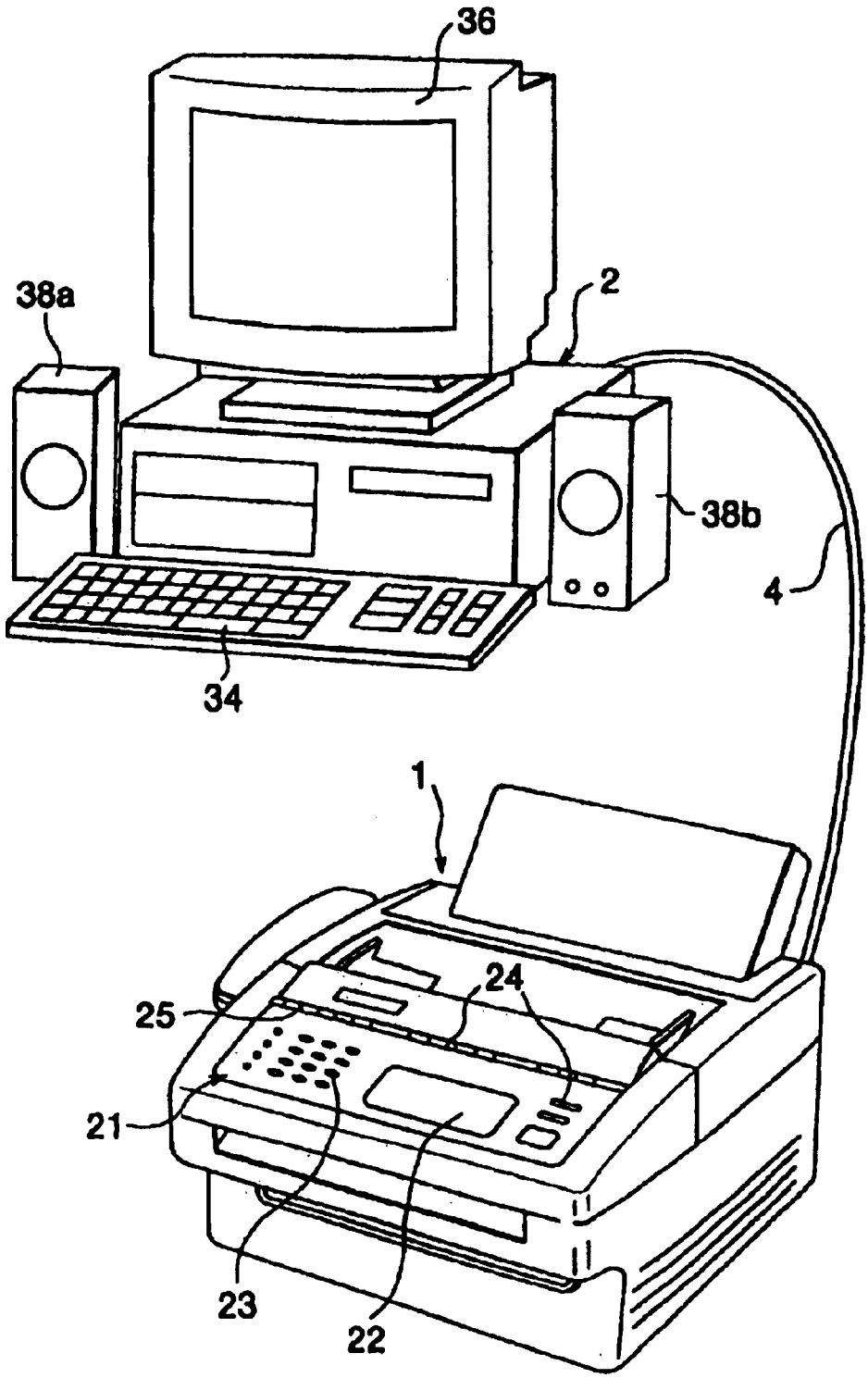
FIG. 1 is a perspective view showing a facsimile system including a facsimile machine and a personal computer mutually connected to each other.

A facsimile system to which the present invention is applied will firstly be described with reference to FIGS. 1 through 4. The term "facsimile system" as used herein is intended to mean a combination of a facsimile machine 1 and a personal computer 2 mutually connected to each other with a cable 4 as shown in FIG. 1. In the following description, the facsimile machine 1 will be described as a calling side.

Figure 2:
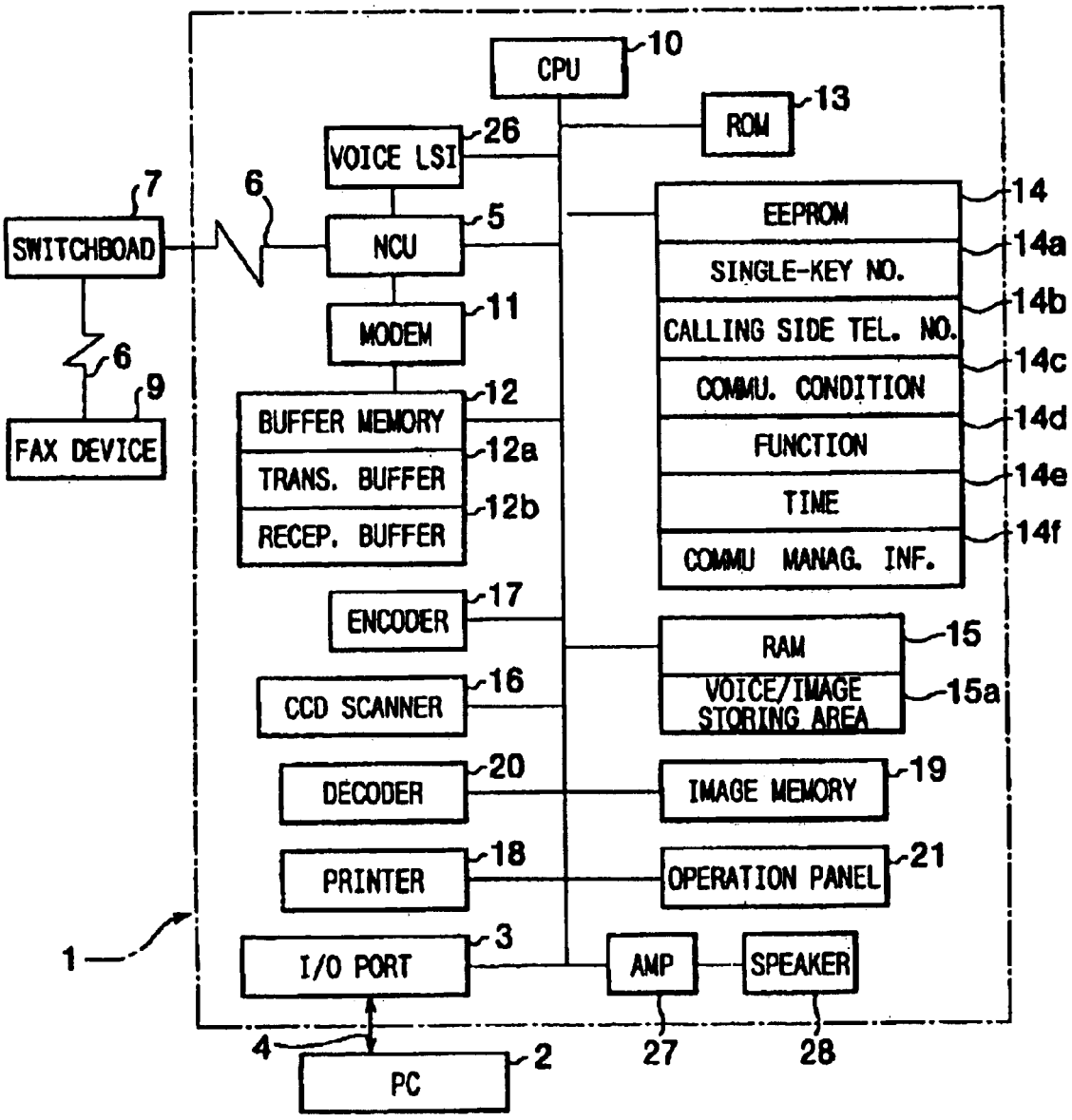
FIG. 2 is a block diagram showing an arrangement of a facsimile machine.
Figure 4:
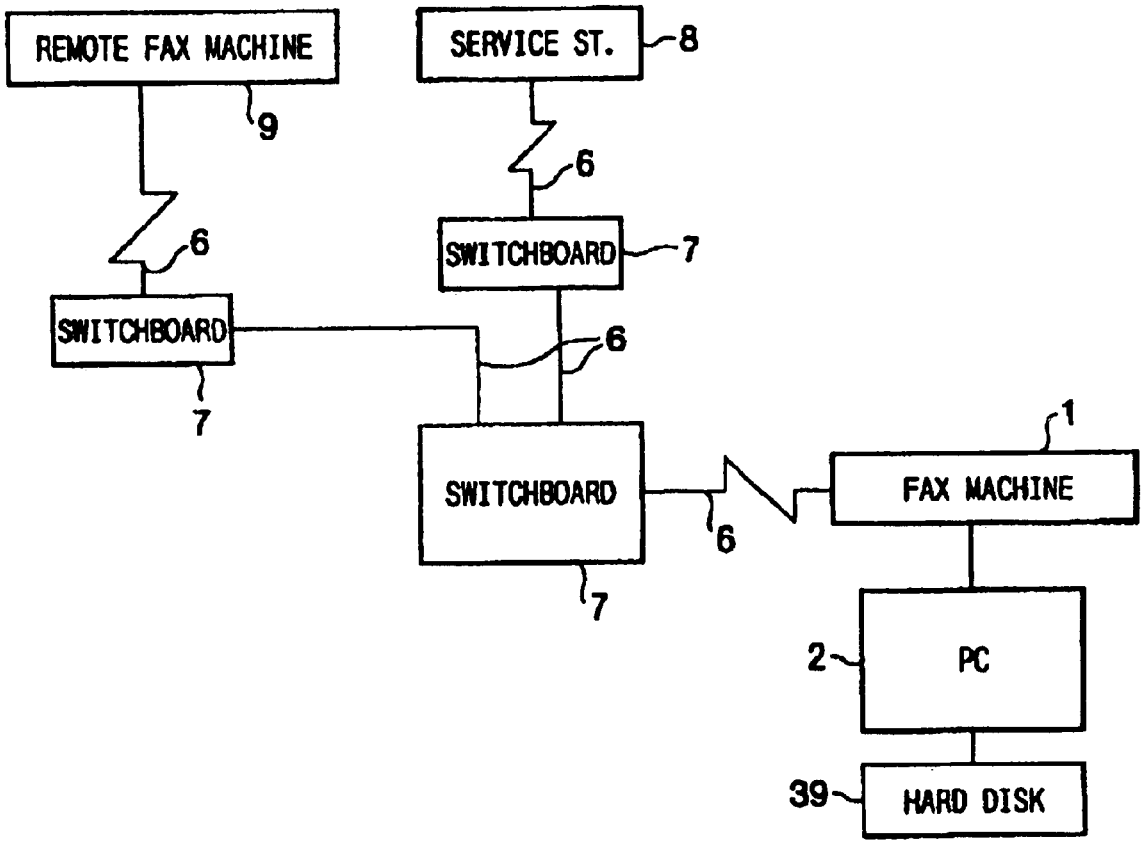
FIG. 4 is a block diagram showing a facsimile system connected to a service station.

As shown in FIG. 2, the facsimile machine 1 has an input/output interface (I/O port) 3 connected to the personal computer 2 with the cable 4. The input/output interface 3 may be a serial interface such as RS-232C, or a parallel interface. The facsimile machine 1 includes a network controller unit (NCU) 5 that is connected through a telephone line 6 to a telephone switchboard 7. As shown in FIG. 4, another facsimile machine 9, which will be described as a receiving side, and a service station 8 are also connected to the telephone switchboards 7 so that the two facsimile machines 1 and 9 are communicable with each other through a telephone line and also the facsimile machine 1 is accessible to the service station 8. Although not shown in FIG. 4, another personal computer equipped with a facsimile board modem may also be connected to the telephone switchboard 7.

Referring back to FIG. 2, the facsimile machine 1 includes a central processing unit (CPU) 10 which is connected to various components to be described later with signal bus lines. The CPU 10 controls its associated components in accordance with a predetermined communication control sequence and executes data communication, that is, facsimile transmission and reception.

A modem 11 executes a data communication function under the aegis of the CPU 10. Specifically, the modem 11 modulates image data in the form of digital signal to an analog signal and transmits the latter signal to a remote facsimile or personal computer through the NCU 5 and the telephone line 6. The modem 11 also demodulates the incoming analog signal received through the telephone line 6 and the NCU 5 to a digital signal. Other than modulation and demodulation, the modem 11 sends to and receives from the remote facsimile machine various kinds of transmission control signals.

The CPU 10 is connected through the bus to a buffer memory 12, a read-only memory (ROM) 13 storing control programs therein, an electrically erasable and programmable read-only memory (EEPROM) 14, a random access memory (RAM) 15 temporarily storing various kinds of data, a CCD scanner 16 executing an image capturing function, an operation panel 21 provided with a liquid crystal display (LCD) 22, a printer 18 executing a printing function, an encoding section 17, a decoding section 20, and an image memory 19.

The buffer memory 12 has a plurality of storage areas including a transmission buffer memory 12a and a reception buffer memory 12b for temporarily storing coded image data transmitted to the called side facsimile machine 9 and received from the calling side facsimile machine 9 along with various kinds of data accompanying the coded image data, reception commands, telephone numbers and names of the subscribers of the called side facsimile machines, and the like. The EEPROM 14 has a single-key number storing area 14a, a calling side telephone number storing area 14b, a communication condition storing area 14c, a function storing area 14d for storing data and various function programs such as a communication mode program, a time storing area 14e for storing incoming and outgoing fax transmission times, and a communication managing information storing area 14f for storing communication records. Those storing areas store data regarding dial numbers (telephone numbers) and the names of the subscribers of called side facsimile machines together with single-key numbers for speed dialing, and various kinds of set data for allowing the user to select whether or not the name of the subscriber of the calling side facsimile machine is registered, a fax transaction report is generated, communications report is printed, or to set a calling bell volume, and to set a volume of the speaker equipped with the facsimile machine 1. The EEPROM 14 is a non-volatile memory so that its storing contents are not lost even if the facsimile machine 1 is power down.

The RAM 15 is used to temporarily store various kinds of data at a time of execution of a prescribed operation. The RAM 15 has a voice/image storing area 15a for storing voice data and image data received from the remote facsimile machine when the called side facsimile machine 1 is set to an auto-answer mode. The data is stored therein in a digital form. The CCD scanner 16 is for capturing images on an original document and produces image data. The image data is encoded by the encoder 17 and the resultant data is temporarily stored in the buffer memory 12 and then transmitted. A modified READ or MR method is used for a redundancy compression coding. According to such method, the image data is encoded in view of statistic property of run-length, i.e., the duration of white signal or black signal, of the image data.

The printer 18 carries out printing of the received image data on a recording paper by way of an electro-photographic recording method or a thermal printing method. In the electro-photographic recording, a latent image is formed on a photosensitive drum by irradiating a laser beam thereonto in accordance with the image data and the latent image is developed using toner particles. The toner image is transferred onto the recording paper and thermally fixed by a thermal fixing device. In the thermal printing method, the image is printed on a thermal-sensitive paper with a thermal head.

The facsimile machine 1 has a copying capability wherein an original document can be copied using the CCD scanner 16 and the printer 18. Copying can be made in two modes, a multi-copy mode and a sort copy mode. The multi-copy mode makes a desired number of copies for each original document. The sort copy mode sorts the pages of each of plural sets of copies in an order of the pages in the original documents.

The image data received from the remote facsimile machine and dot data for generating print outputs are stored in an image memory 19 which may be a dynamic RAM (DRAM). In a normal fax reception operation in which fax transmission and reception are taken place at a real time, the image data is received after exchanging signals according to a predetermined communication control sequence between the called facsimile machine 1 and the calling facsimile machine 9 or personal computer 8. The image data is temporarily stored in the buffer memory 12 in the form of an analog signal. The image data stored therein is decoded (expanded) by the decoder 20. The resultant data is developed into a dot image and written into the bit image storing area of the image memory 19 so as to print the image on a page basis. The dot image stored in the image memory 19 is developed into bits of a predetermined resolution and the resultant data is sent to the printer 18 for printing on a page basis.

At a time of a memory reception in the facsimile machine, the image data received from the remote facsimile machine is temporarily stored in the image memory 19 upon compressing it. When the received image data is printed, it is developed into the bits of the predetermined resolution and separately stored in the image memory 19. The image data received when the facsimile machine 2 is in the memory reception mode can be transmitted to an external storage device 39 (see FIGS. 3 and 4) to process the received image data in the personal computer 2. The same is true with respect to the image data stored in the voice/image storing area of the RAM 15 when the facsimile machine is in an auto-answer mode.

When the facsimile transmission is made, the original document to be sent is read by the CCD scanner 16, and the image data output from the CCD scanner 16 is encoded and the resultant data is sent to the remote facsimile machine. When the image data is sent by a memory transmission, the encoded image data is temporarily stored in the image memory 19 and automatically transmitted to the destination shortly thereafter or at a specified time. A scheduled/delayed transmission (timer transmission) is performed when there is a time lag between two places where a communication link is established or when a group transmission is performed wherein the same original document is sent to a plurality of subscribers.

The image data input from the personal computer 2 has already been encoded, so it can be transmitted to the remote facsimile machine after temporarily storing it in the image memory 19. The operation panel 20 provided in the facsimile machine 1 or 9 has a display 22 such as a liquid crystal display for displaying operation conditions of the facsimile machine. The operation panel 20 also has numeral keys 23, function keys 24, and one-touch registration key 25 as shown in FIG. 1. Registration for a memory dialing is performed by entering the telephone number and the name of a called party through depressing the numeral keys 23 and the function keys 24, and then depressing the one-touch registration key 25. A predetermined function key is depressed to send a help command to the personal computer 2 when a help function to be described later is used.

The facsimile machine 1 further includes a voice LSI 26 for storing an answer voice message that is sent out when answering to the incoming call in the auto-answer mode, an amplifier 27 and speaker for reproducing the incoming voice message recorded during the auto-answer mode, and a reproduction key (not shown) for generating an instruction to reproduce the recorded messages.

Figure 3:
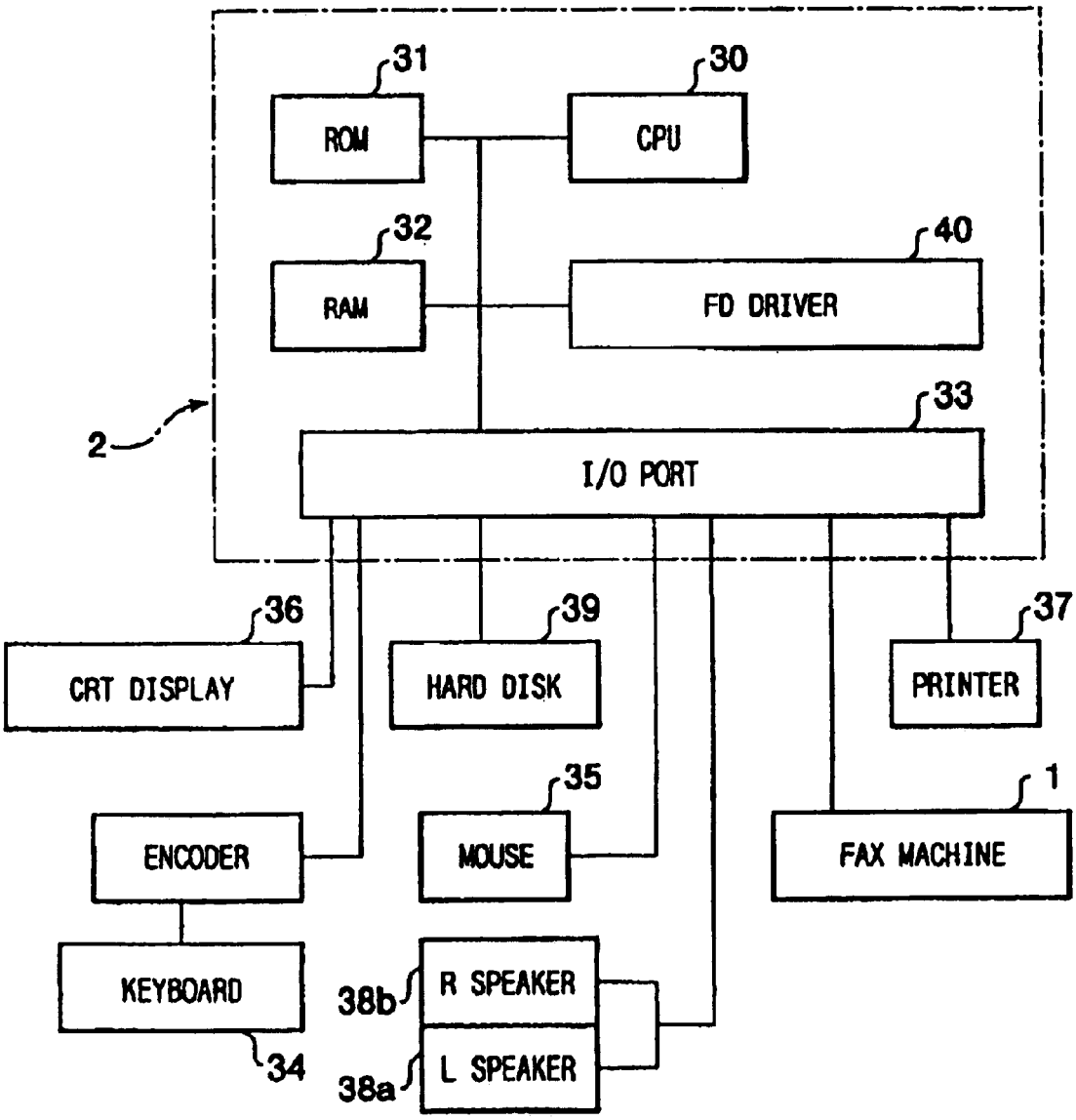
FIG. 3 is a block diagram showing an arrangement of a personal computer.

As shown in FIG. 3, the personal computer 2 includes a central processing unit (CPU) 30, a ROM 31 storing control programs, a RAM 32 for storing various kinds of data, an input/output port (interface) 33 and a floppy disk driver 40. To the personal computer 2 are connected various peripheral components such as a keyboard 34, a mouse 35, a CRT display 36, a printer 37, left and right speakers 38a and 38b, the facsimile machine 1, the external storage device 39 such as a hard disk. A liquid crystal display may be used in place of the CRT display 36.

Referring again to FIG. 4, the service station 8 stores application softwares relating to control programs. The control programs execute various functions of the facsimile machine 1. The control programs are developed by a manufacturer of the facsimile machine 1. Version-up application softwares are stored in the service station 8.

The ROM 13 of the facsimile machine 1 stores a basic control program for transmission and reception of data to and from the telephone line 6 and also stores a data transfer control program for a data transfer between the facsimile machine 1 and the personal computer 2. The control program of the facsimile machine 1 is pre-installed in the hard disk 39 of the personal computer 2. The facsimile machine 1 is operated to execute a particular function in accordance with a corresponding control program stored in the hard disk 39 of the personal computer 2.

The CPU 10 of the facsimile machine 1 serves as a support control means for downloading the application software supplied from the service station 8 and installing the same in the hard disk 39 of the personal computer 2. The EEPROM 14 or the ROM 13 of the facsimile machine 1 stores an identification (ID) code of its own facsimile machine 1 that corresponds to a manufacture number attached to the facsimile machine 1 by the manufacturer. The ID code is given to the purchaser who bought the facsimile machine 1 when he or she is registered as the user of the facsimile machine 1 in the manufacturing company or a sales service company. The registration ID code is stored in the service station 8 and also informed to the user. In this case, the user has to store the registration ID code to the EEPROM 14 while referring to an operation guide book. The user is capable of knowing the telephone number of the service station 8 from the operation manual.

Figure 5:
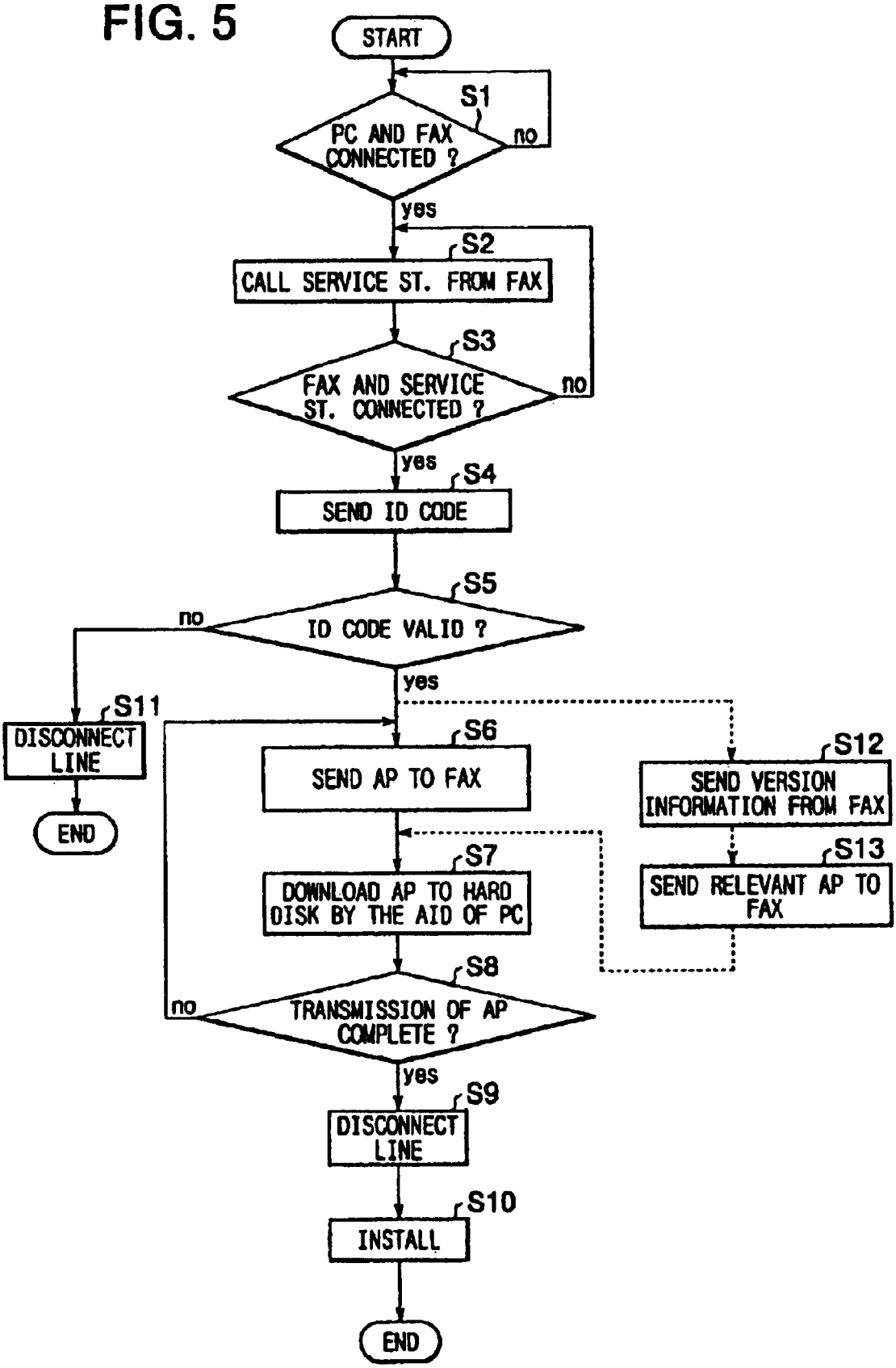
FIG. 5 is a flowchart illustrating an application software installation process according to a first embodiment of the present invention.

Referring next to the flowchart of FIG. 5, a download/installation process will be described for downloading an application software from the service station 8 and installing the same in the hard disk 39 of the personal computer 2.

The routine starts upon powering the facsimile machine 1 and the personal computer 2. Initially, determination is made as to whether or not the personal computer 2 and the facsimile machine 1 are mutually connected (S1). When the personal computer 2 and the facsimile machine 1 are connected (S1: Yes) and thus data communication therebetween is possible, the user dials the service station 8 from the facsimile machine 1 (S2). This can be automatically accomplished by a program stored in the facsimile machine 1.

When the facsimile machine 1 and the service station are connected (S3: Yes), the facsimile machine 1 sends out its own registration ID code to the service station (S4). Upon receipt of the registration ID code, the service station 8 checks if the received ID code is valid by verifying the received ID code with registered ID codes stored in the service station 8. If determination is made that the received ID code is valid (S5: Yes), the service station 8 sends at least one application software to the facsimile machine 1 (S6). By the operation of the CPU 10 acting as a support control means, the application software is downloaded in the hard disk 39 of the personal computer 2 (S7). When sending the application software is complete (S8: Yes), the telephone line is disconnected (S9) whereupon the personal computer 1 installs the downloaded software in its hard disk 39. In S5, if determination is made so that the received ID code is invalid (S5: No), the telephone line 6 is disconnected (S11) and the communication is terminated.

A modification can be made so that after execution of S5, the facsimile machine 1 sends to the service station 8 information on a version of the application software that has been stored in the facsimile machine 1 (S12) and then the service station 8 sends a relevant application software to the facsimile machine 1 based on the information supplied from the facsimile machine 1 (S13). By supplementing these two steps, an irrelevant software will not eventually be sent to the facsimile machine 1. Therefore, superfluous data transfer will not be performed and thus a communication time can be minimized.

Figure 6:
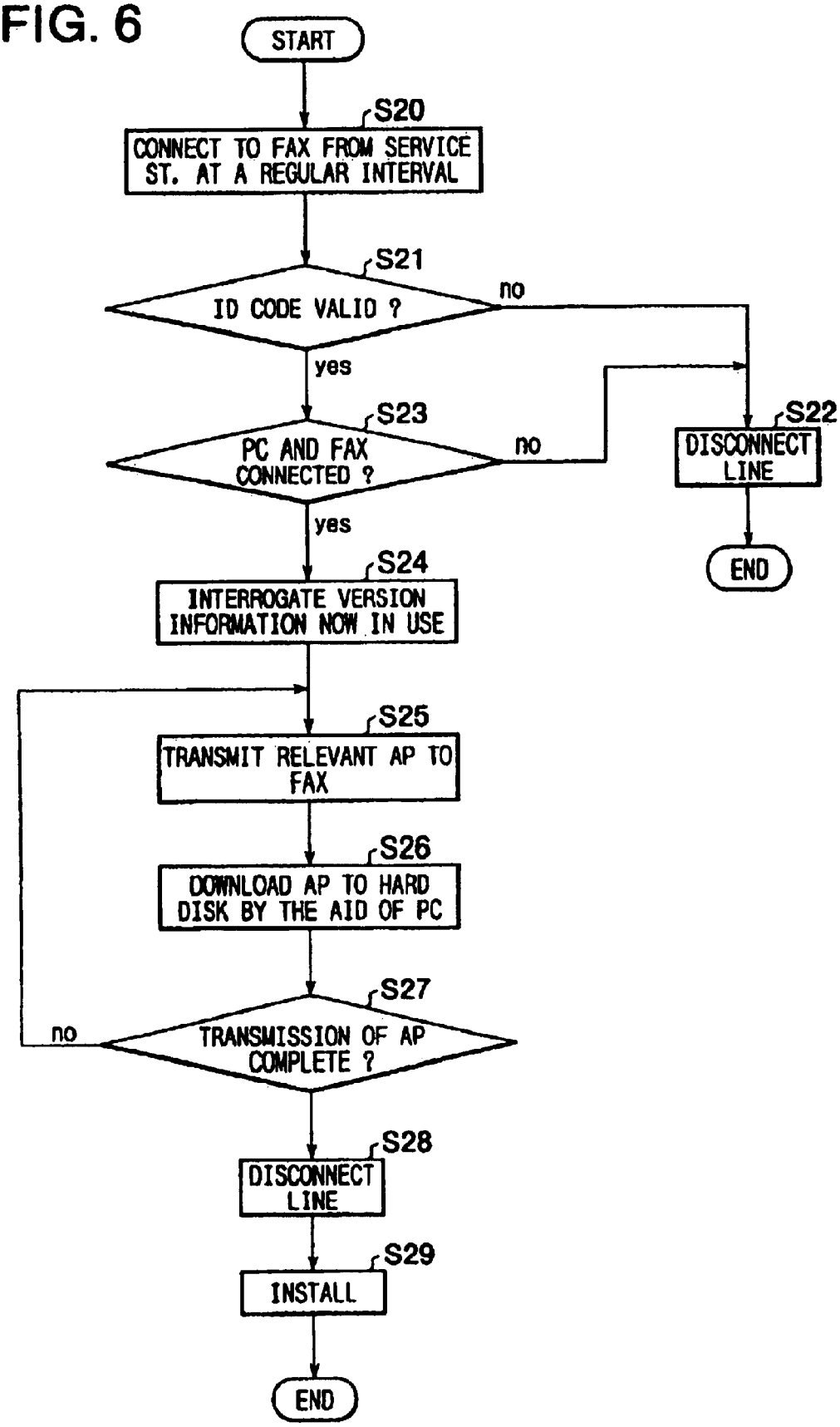
FIG. 6 is a flowchart illustrating an application software installation process according to a second embodiment of the present invention.

The flowchart shown in FIG. 6 pertains to a second embodiment of the present invention. The routine starts when both the facsimile machine 1 and the personal computer 2 are powered. Based on the ID codes and telephone numbers, the service station 8 connects the telephone line to the facsimile machines at a regular interval (S20). Upon connection to a facsimile machine 1, the ID code stored in the facsimile machine 1 and that stored in the service station 8 are compared to determine that the two ID codes are in coincidence with each other (S21). If the two ID codes are not in coincidence with each other (S21: No), the telephone line 6 is disconnected (S22) whereupon the routine is ended. When the two ID codes are in coincidence with each other, i.e., when the facsimile machine 1 has a valid ID code (S21: Yes), determination is made as to whether or not the facsimile machine 1 and the personal computer 2 are connected (S23). When the facsimile machine 1 and the personal computer 2 are not connected (S23: No), the telephone line is disconnected (S22), whereupon the routine is ended.

When the facsimile machine 1 and the personal computer 2 are connected (S23: Yes), the service station 8 interrogates the facsimile machine 1 the version of the application software stored in the personal computer 2 (S24). The service station 8 sends an appropriate application software to the facsimile machine 1 (S25). Under the aegis of the CPU 10 of the personal computer 2, the application software thus received from the service station 8 is stored in the hard disk 39 of the personal computer 2. When sending the application software is complete (S27: Yes), the telephone line 6 is disconnected (S28) and the downloaded application software is installed in the personal computer 2 so as to be usable (S29).

The user can obtain the updated application software if the service station 8 performs such an automatic software support service. It is desirable that the display 36 displays a message that the version-up application software is running and also an operation guidance on how the new application software is to be used. By so doing, erroneous operation of the new application software can be prevented.

In the second embodiment, either the CPU 10 of the facsimile machine 1 or the CPU 30 of the personal computer 2 may act as the support control means. Facsimile machines may be sold on the market with a floppy disk storing only a control program relating to a data transfer between the facsimile machine 1 and the personal computer 2. In this case, the application software for various functions of the facsimile machine 1 is supplied to the purchaser from the service station 8 in a manner as described above.

A third embodiment of the present invention will be described with reference to the flowchart shown in FIG. 7. The third embodiment pertains to a help list generating process. When a user depresses a help key to know how to set and how to use various functions of the facsimile machine, a help list is indicated on the display 36 of the personal computer 2. The help list can be printed out from the printer 37 of the personal computer 2 or the printer 18 of the facsimile machine 1. Data regarding the help list and a program (application software) for manipulation of the help list are stored in a floppy disk. A facsimile machine is sold on the market with the floppy disk. The help list data and the program supplied by the floppy disk are installed in the hard disk 39 of the personal computer 2 in a manner known in the art. A basic help list has been stored in the EEPROM 14 of the facsimile machine.

Figure 7:
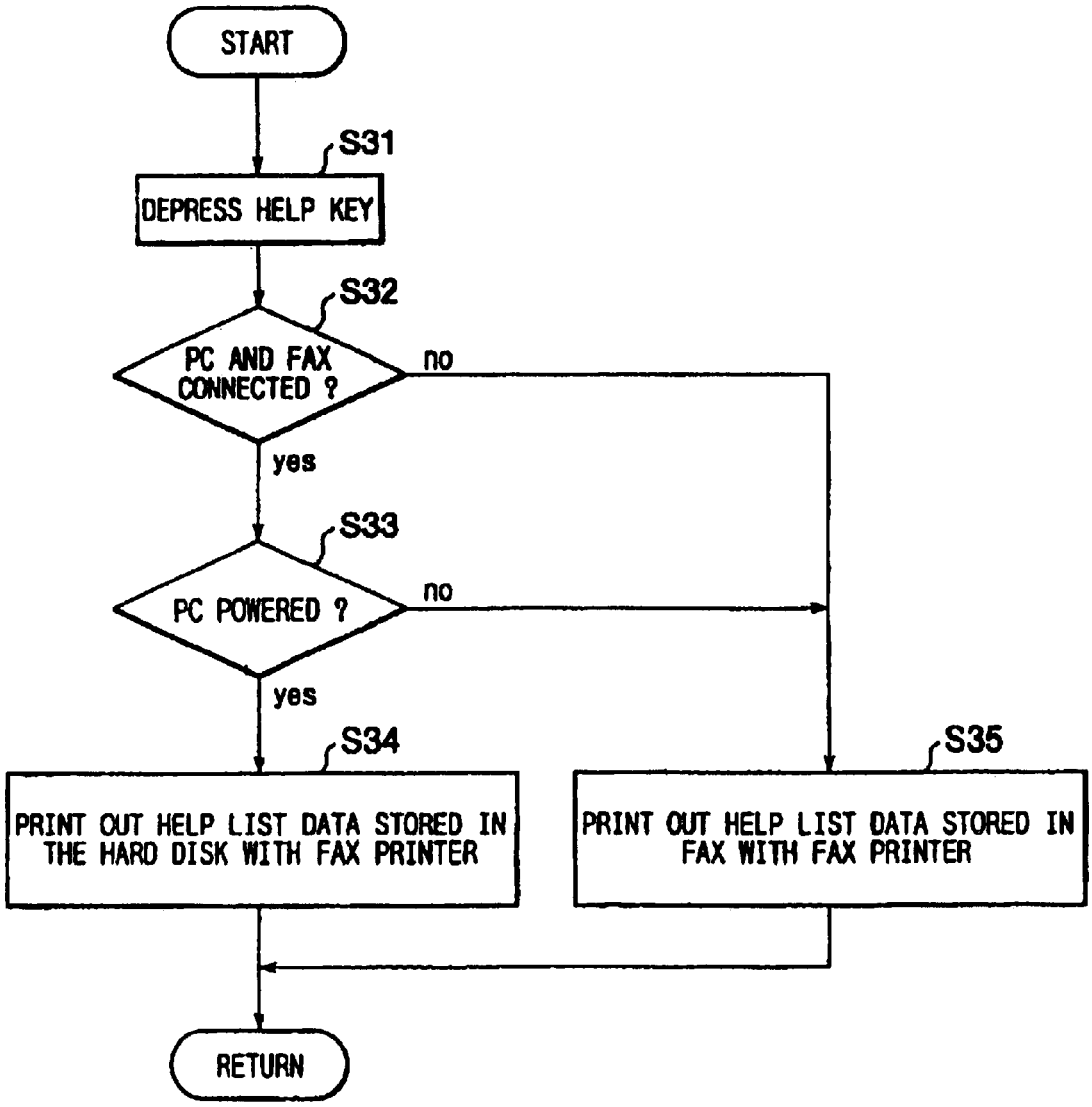
FIG. 7 is a flowchart illustrating a help list generating process according to a third embodiment of the present invention.

Referring to the flowchart shown in FIG. 7, when the user depresses the help key on the facsimile machine 1 (S31), a connection confirmation command is sent from the facsimile machine 1 to the personal computer 2 to determine that the personal compute 2 is connected to the facsimile machine 1 (S32). When the determination is made so that the personal computer 2 is connected to the facsimile machine 1 (S32: Yes), whether or not the personal computer 2 is powered is determined (S33). When the personal computer 2 is powered (S33: Yes), data regarding the help list as stored in the hard disk 39 of the personal computer 2 is transferred to the facsimile machine 1 to print the help list on a recording paper with the printer 18 (S34). Alternatively, the help list may be displayed on the display 36 of the personal computer 2 or printed out using the printer 37 on part of the personal computer 2. The help list may also be displayed in the LCD 22 on the operation panel 21 of the facsimile machine 1.

To shorten the transmission time, it is desirable not to download the help list which has already been downloaded from the personal computer 2. However, when the memory in which the help list data is stored is also used as a buffer, downloading the help list again must be permitted because the help list data may be damaged for some reasons.

When the personal compute 2 and the facsimile machine 1 are not connected (S32: No) and when the personal compute 2 is not powered (S33: No), the basic help list stored in the facsimile machine 1 is printed with the printer 18 or displayed on the LCD 22.

A modification of the third embodiment may be made so that the help list data stored in the hard disk 39 is displayed on the display 36 of the personal computer 2 or printed on a recording paper using the printer 37 when the help key on the keyboard 34 of the personal computer 2 is depressed.

With the third embodiment of the present invention, the user can readily obtain a detailed help list. It is no longer necessary for the user to consult a guide book as is done conventionally. Further, whereas only a basic help list was available in a conventional facsimile machine, detailed help list can become available with the facsimile system of the third embodiment. It is no longer necessary to store a large amount of data regarding the help list in the memory (such as, EEPROM 14) of the facsimile machine 1 but is stored in the hard disk 39 of the personal computer 2. This is possible because recent personal computers are equipped with a hard disk of a large storage capacity. By making use of the residual storage area of the hard disk 39, the manufacturing cost of the facsimile machine 1 can be reduced.

It is preferable that a color ink jet printer be used in the printer of the facsimile machine 1 and the personal computer 2 because color-printed help list is more comprehensive than a monochromatic printing.

Figure 8:
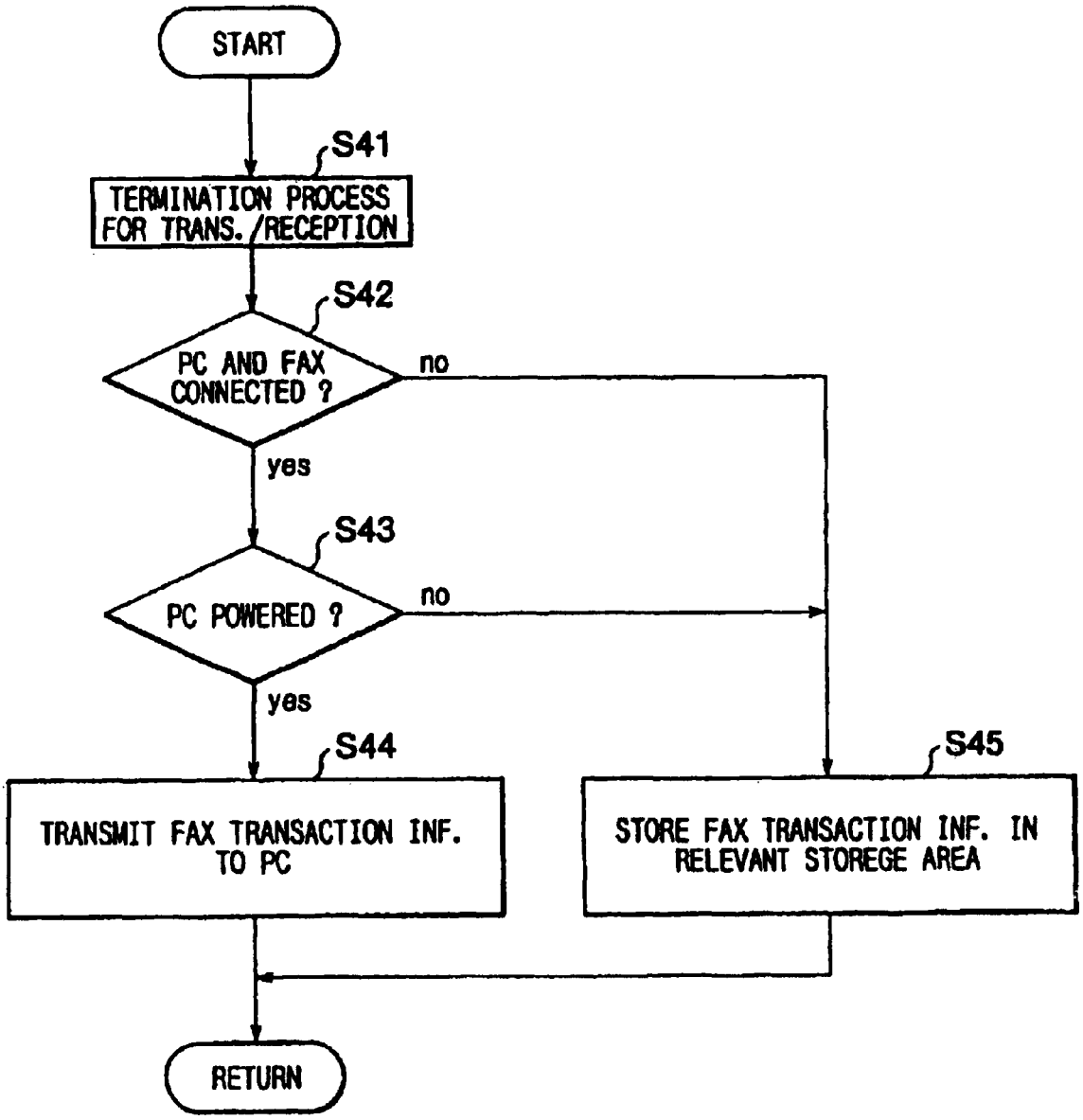
FIG. 8 is a flowchart illustrating a string process of a communications interactive information according to a forth embodiment of the present invention.

A forth embodiment of the present invention will be described with reference to FIG. 8 which pertains to a data storing process of a facsimile transaction information. After the start of this process, each time when data transmission to or data reception from a remote facsimile machine is over (S41), whether or not the facsimile machine 1 is connected to the personal computer 2 is determined (S42). When the facsimile machine 1 is connected to the personal computer 2 (S42: Yes), whether or not the personal compute 2 is powered is determined (S43). When the personal computer 2 is powered (S43: Yes), the facsimile transaction information are transferred to and stored in the hard disk 39 of the personal computer 2. The facsimile transaction information includes year/month/day and time data on the transmission and reception, name and telephone number of the calling or called party, communication time involved, number of sheets transmitted or received, and transmission mode.

If the facsimile machine 1 is not connected to the personal computer 1 (S42: No) or if the personal computer 1 is not powered (S43: No), the facsimile transaction information is stored in the communications managing data storing area 14f of the facsimile machine 2 (S45). Transfer of the facsimile transaction information to the personal computer 2 may be carried out whenever the transmission or reception is complete or at a regular interval.

The storage capacity of the communication managing information storing area 14f is not so large. Typically, only several tens of pieces of facsimile transaction information can be stored therein. When the information to be stored therein exceeded the storage capacity of the area 14f, the data therein are erased in a first-in first-out fashion to thereby allow newest data to be stored therein. Therefore, if the old data wants to be retained for a long time, the hard disk of the personal compute 2 is utilized to store the data.

When the facsimile transaction information is generated by the facsimile machine 1, it may be displayed one by one on the LCD 22, or printed out on a recording paper at every predetermined interval, or a predetermined number of pieces of information may be printed out on the recording paper at a time. The facsimile transaction information stored in the hard disk 39 of the personal computer 2 may be uniquely managed by a managing application software. For example, the transmission results and the reception results may be separately managed. Or, the data may be collected from the accumulated facsimile transaction information according to the customers, the department to which the facsimile message is addressed, the number of transmissions and receptions made in a month, etc. These pieces of information can be printed with the printer 37 at the side of the personal computer 2. The facsimile transaction information can thus be effectively used if stored in the memory or hard disk 39 of the personal computer 2.

While some exemplary embodiments of this invention have been described in detail, those skilled in the art will recognize that there are many possible modifications and variations which may be made in these exemplary embodiments while yet retaining many of the novel features and advantages of the invention.

What is claimed is:

1. A facsimile system, comprising:

a facsimile machine having an input/output interface, a storage device, a printing section, and a display unit, said facsimile machine being provided with a variety of functions;

a personal computer connected to said input/output interface of said facsimile machine, said personal computer having a data storage device storing help list data regarding how to set and how to use the variety of functions of the facsimile machine, [a printing section,] and a display unit, said personal computer generating a help list based on the help list data when requested by a user; and a help key through which the user inputs a command for requesting the help list.

2. The facsimile system according to claim 1, wherein the help list generated by the personal computer is printed out by said printing section of said facsimile machine.

3. The facsimile system according to claim 1, wherein the help list generated by the personal computer is displayed on said display unit of said facsimile machine.

[4. The facsimile system according to claim 1, wherein the help list is printed out by said printing section of said personal computer.]

5. The facsimile system according to claim 1, wherein the help list is displayed on said display unit of said personal computer to indicate the help list thereon.

6. The facsimile system according to claim 1, wherein basic help list data is stored in said storage device of the facsimile machine and a basic help list is printed out by said printing section of said facsimile machine when said facsimile machine and said personal computer are disconnected from each other.

7. The facsimile system according to claim 1, wherein basic help list data is stored in said storage device and a basic help list is generated by said display unit of said facsimile machine to indicate the basic help list when said facsimile machine and said personal computer are not connected to each other.

8. A printing system, comprising:

a printer having an input/output interface, a storage device, a printing section, and a display unit, said printer being provided with a variety of functions;

a personal computer connected to said input/output interface of said printer, said personal computer having a data storage device storing help list data regarding how to set and how to use the variety of functions of the printer, [a printing section,] and a display unit, said personal computer generating a help list based on the help list data when requested by a user; and a help key through which the user inputs a command for requesting the help list.

9. The printing system according to claim 8, wherein the help list generated by the personal computer is printed out by said printing section of said printer.

10. The printing system according to claim 8, wherein the help list generated by the personal computer is displayed on said display unit of said printer.

[11. The printing system according to claim 8, wherein the help list is printed out by said printing section of said personal computer.]

12. The printing system according to claim 8, wherein the help list is displayed on said display unit of said personal computer to indicate the help list thereon.

13. The printing system according to claim 8, wherein basic help list data is stored in said storage device of the printer and a basic help list is printed out by said printing section of said printer when said printer and said personal computer are disconnected from each other.

14. The printing system according to claim 8, wherein basic help list data is stored in said storage device and a basic help list is generated by said display unit of said printer to indicate the basic help list when said printer and said personal computer are not connected to each other.

15. A peripheral device having at least one function, the peripheral device being capable of connecting with a host device having a data storage device storing help list data regarding how to set and how to use the at least one function of the peripheral device, the peripheral device comprising:

an input/output interface connectable to the host device;

a help key through which a user inputs a command for requesting the help list;

a read unit that reads out the help list data stored in the data storage device of the host device via the input/output interface when the peripheral device is connected to the host device and when requested by operating the help key by the user; and a display unit that shows a help list based on the help list data read from the host device via the input/output interface when the peripheral device is connected to the host device.

16. The peripheral device according to claim 15, wherein the display unit includes a printer that prints out the help list on a recording medium when the peripheral device is connected to the host device.

17. The peripheral device according to claim 15, wherein the display unit includes a display device that visually displays the help list thereon when the peripheral device is connected to the host device.

18. The peripheral device according to claim 15, further comprising a storage device that stores a basic help list data, wherein the display unit shows the basic help list when the peripheral device and the host device are disconnected from each other upon when requested by the user operating the help key.

19. A host device capable of connecting with a peripheral device having at least one function and a help key through which a user inputs a command for requesting a help list, the host device comprising:

an input/output interface connectable to the peripheral device;

a data storage device storing help list data regarding how to set and how to use the at least one function of the peripheral device;

a read unit that reads out the help list data stored in the data storage device when requested by operating the help key by the user when the host device is connected to the peripheral device; and a display unit that shows a help list based on the help list data read from the data storage device when the host device is connected to the peripheral device.

20. The host device according to claim 19, wherein the display unit includes a printer that prints out the help list on a recording medium when the host device is connected to the peripheral device.

21. The host device according to claim 19, where in the display unit includes a display device that visually displays the help thereon when the host device is connected to the peripheral device.

22. A peripheral device having at least one function, the peripheral device being capable of communicating with a host device having a data storage device storing help list data regarding how to set and how to use the at least one function of the peripheral device, the peripheral device comprising:

an input/output interface communicable to the host device;

a help key through which a user inputs a command for requesting a help list;

a read unit that reads out the help list data stored in the data storage device of the host device via the input/output interface when the peripheral device communicates to the host device when requested by operating the help key by the user; and a display unit that shows a help list based on the help list data read from the host device via the input/output interface when the peripheral device communicates to the host device.

*23. A facsimile system, comprising:*

*a facsimile machine having an input/output interface, a storage device, a printing section, and a display unit, said facsimile machine being provided with a variety of functions;*

*a personal computer connected to said input/output interface of said facsimile machine, said personal computer*

*having a data storage device storing help list data regarding how to set and how to use the variety of functions of the facsimile machine, a printing section, and a display unit, said personal computer generating a help list based on the help list data when requested by a user; and*

*a help key through which the user inputs a command for requesting the help list.*

*24. The facsimile system according to claim 23, wherein the help list is printed out by said printing section of said personal computer.*

*25. A printing system, comprising:*

*a printer having an input/output interface, a storage device, a printing section, and a display unit, said printer being provided with a variety of functions;*

*a personal computer connected to said input/output interface of said printer, said personal computer having a data storage device storing help list data regarding how to set and how to use the variety of functions of the printer, a printing section, and a display unit, said personal computer generating a help list based on the help list data when requested by a user; and*

*a help key through which the user inputs a command for requesting the help list.*

*26. The printing system according to claim 25, wherein the help list is printed out by said printing section of said personal computer.*

* * * * *